United States Patent

[11] 3,597,041

| [72] | Inventors | Dolph G. Frantz;<br>William Joseph, both of 3427 Norman Bridge Road, Montgomery, Ala. 36105 |
|---|---|---|
| [21] | Appl. No. | 797,514 |
| [22] | Filed | Feb. 7, 1969 |
| [45] | Patented | Aug. 3, 1971 |

[54] HEAD SUPPORTED BINOCULAR INSTRUMENT WITH REPLACEABLE LENSES WORN AS GLASSES
5 Claims, 6 Drawing Figs.

[52] U.S. Cl. ............................................. 350/72, 350/75, 350/76, 350/145, 351/5
[51] Int. Cl. ............................................. G02b 7/02
[50] Field of Search ............................................. 350/72, 75, 76, 145, 146; 351/128, 414, 4, 5, 21

[56] References Cited
UNITED STATES PATENTS

| 1,272,214 | 7/1918 | Campus | 350/76 X |
| 2,280,354 | 4/1942 | Rezos | 350/72 X |
| 2,598,145 | 5/1952 | Steadman | 350/72 |
| 2,625,855 | 1/1953 | Gaylor | 350/57 X |
| 2,753,762 | 7/1956 | Dorgelys | 350/72 UX |
| 3,076,381 | 2/1963 | Dowling et al. | 350/76 |
| 3,414,347 | 12/1968 | Stoltze | 350/72 X |
| 3,420,599 | 1/1969 | Frantz et al. | 350/72 X |
| 2,955,156 | 10/1960 | Heilig | 350/146 X |

FOREIGN PATENTS

| 372,895 | 7/1939 | Italy | 350/146 |

*Primary Examiner*—David Schonberg
*Assistant Examiner*—Toby H. Kusmer
*Attorney*—Jones & Lockwood ABSTRACT: The binocularlike viewer has a casing that fits the forehead of the wearer and is held on by a pair of temples. There is a removable front transparent shield. The casing has bottom and top halves. The bottom half has formed therein a nose receiving recess. The rear wall of the casing has spaced apart horizontally elongated apertures for each eye. Mounted on the nose portion adjacent the rear wall is a lens system having the binocular eye pieces and prescription lenses for the wearer all of which are interpupillarly adjustable from a control outside the casing. There is mounted in the front for telescopic movement controlled from outside the casing, a framework with a pair of horizontally elongated apertures. This framework has mounted thereon a lens system having the front binocular lenses and replaceable framed lenses for near point vision for people with subnormal vision.

INVENTORS
DOLPH G. FRANTZ
WILLIAM JOSEPH
ATTORNEYS

INVENTORS
DOLPH G. FRANTZ
WILLIAM JOSEPH
BY Beall and Jones
ATTORNEYS

HEAD SUPPORTED BINOCULAR INSTRUMENT WITH REPLACEABLE LENSES WORN AS GLASSES

It is an object of this invention to provide a binocular instrument that may be easily worn and is shielded from extraneous light.

Another object of the invention is to provide an attractively housed binocular instrument that has a clear transparent front shield that may be snapped off and replaced with a filter shield.

A further object of the invention is to provide in a binocular instrument prescription lenses for the eye correction of the wearer adjacent the binocular rear lens system.

A still further object of the invention is to provide in the front lens system of the binocular instrument removable framed lens for near point vision for people with subnormal vision.

Yet a still further object of the invention is to provide in a binocular instrument front and rear lens systems that have grooved portions in arcuate members to removably receive the eye pieces and front lenses of the binocular system and prescription lens for the wearer adjacent the binocular eye pieces and near point vision lenses adjacent the front binocular lenses for subnormal vision.

Throughout the description, like reference numbers refer to similar parts.

Figure 1:
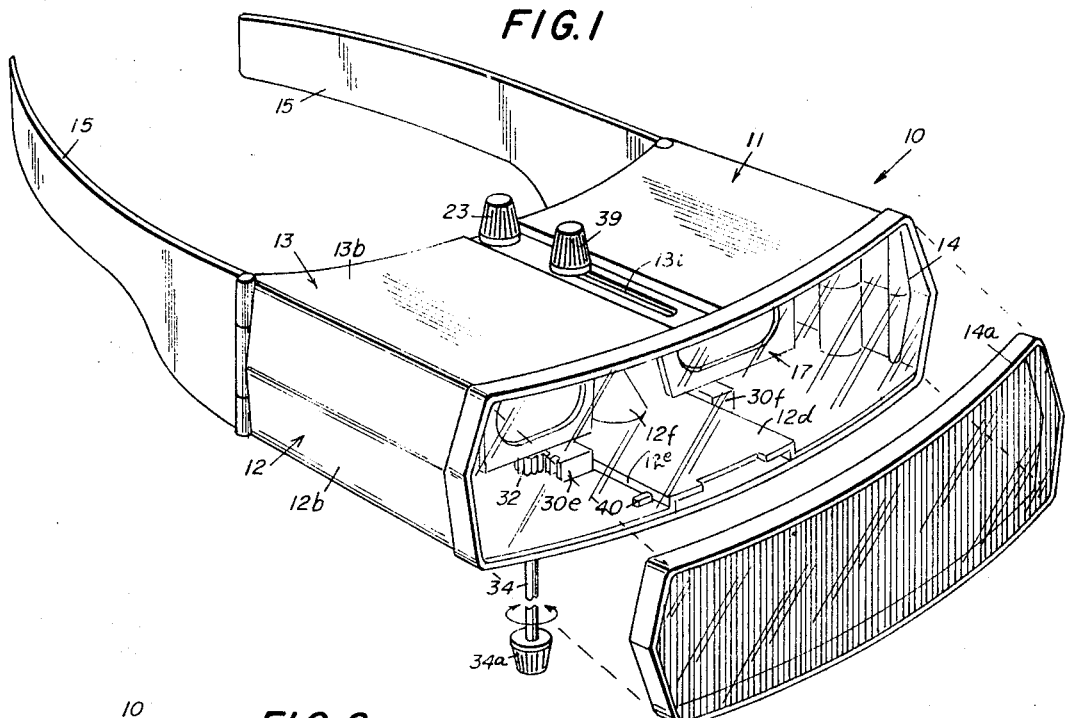
FIG. 1 is a perspective view of the binocular instrument having a removable clear front shield that may be replaced with a filter shield shown thereadjacent.

The binocular instrument is generally indicated at 10. It has a casing 11 made up of a lower half 12 and an upper half 13. There is a removable front transparent shield 14 that may be interchanged with a filter shield 14a. There are temples 15 attached by pivot pins 15a to the rear ends of the respective side walls 12b and 13b of the halves of the casing. The casing 11, temples 15 and frame for the front shield 14 are molded of suitable plastic material.

The bottom 12a of the lower half of the casing has longitudinally extending indented portion 12d with parallel sides 12e which telescopically guides a front lens system 17 for focusing with a rear lens system 16. The rear of the indented portion 12d is formed in an upwardly protruding fashion that provides a nose receiving recess 12f for the wearer. A suitable soft pad (not shown) may be attached to the nose contact surface.

The bottom and top halves 12 and 13 have suitable vertically aligned strengthening bosses 12g and 13g. Adjacent each side of the top and bottom halves are further larger bosses 13h and 12h. The bottom bosses 12h have an axial recess that opens to the bottom 12a to receive a securing screw that is threadedly received in a bottom axial recess in the upper bosses 13h.

Figure 5:
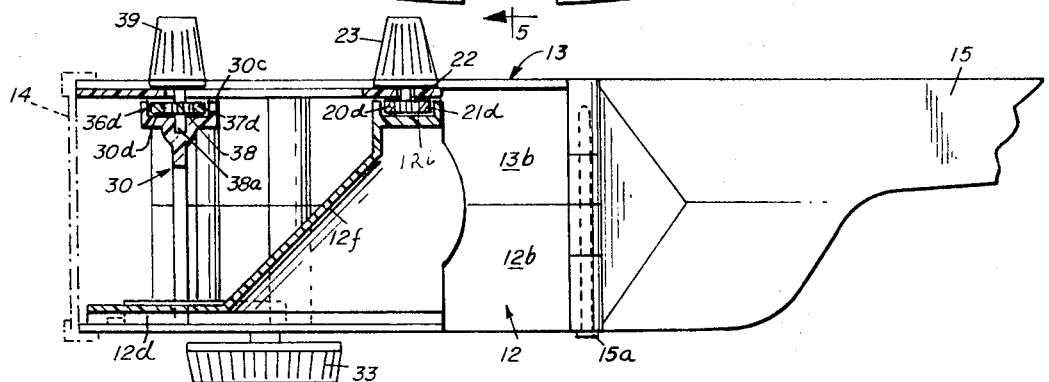
FIG. 5 is a longitudinal sectional view along line 5–5 of FIG. 4.

The rear walls 12c and 13c have eye apertures 18 that are ovallike with the major axis extending horizontally. This provides for interpupillar spacing of the rear lens system so that there is always a visual path fore and aft through the rear and front lens systems 16 and 17 as will be more fully described. Formed in the bottom 12a just forward of the rear wall 12c are transversely raised guides 19 that guide right and left lens receiving frame members 20 and 21. Each of the members 20 and 21 of the rear lens system have lower leg portions with transverse slots 20a and 21a received by the guides 19. The upper portions 20b and 21b of members 20 and 21 form with the leg portions downwardly opening arcuate portions each having a pair of fore and aft spaced grooves 20c and 21c to removably receive framed lens held frictionally therein. The upper portions 20b and 21b of members 20 and 21 have oppositely and inwardly extending horizontally extending portions 20d and 21d offset fore and aft and spaced apart slidingly received in a horizontal slot 12i, see FIG. 5, in the top of nose portion 12f. The portions 20d and 21d have rack teeth therein facing each other. A pinion gear 22 is received between portions 20d and 21d and meshes with the rack teeth. The pinion 22 is fixedly mounted on a shaft 22a extending upwardly through an aperture in top 13a. A removable knurled control knob 23 is received on the upwardly extending end of shaft 22a and secured to the shaft to turn the same. By rotating the knob 23, the interpupillar distance of the rear lens system members 20 and 21 is adjusted. The apertures 18 in the rear wall 12c accommodate the interpupillar adjustment of the rear lens system.

Figure 4:
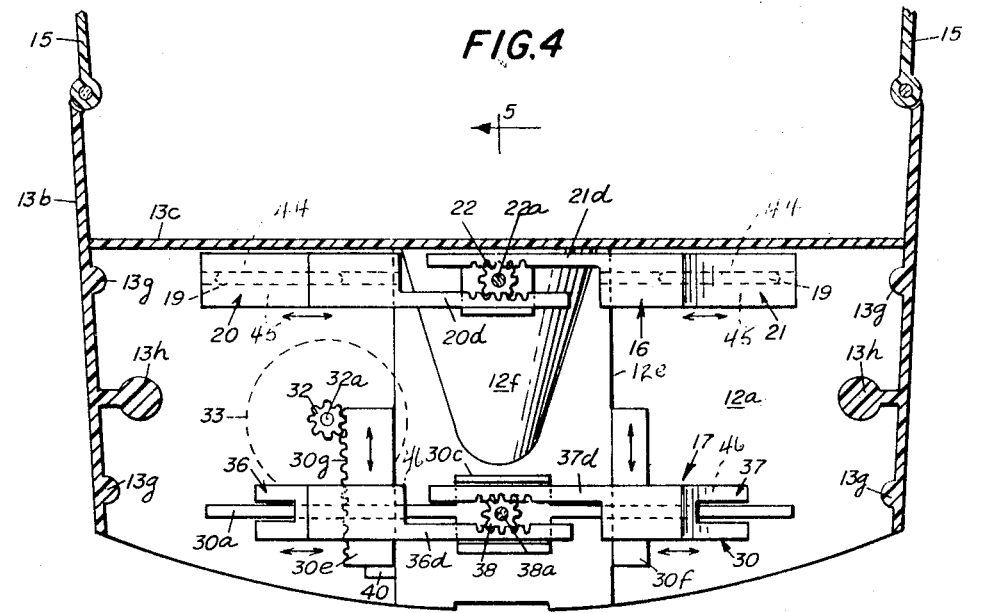
FIG. 4 is a plan view along line 4–4 of FIG. 2.

The front lens system 17 is mounted on a transverse framework 30 having right and left panels 30a and 30b connected together by a top portion 30c. Each panel has an oval-like aperture 31 therethrough that is in see through alignment with the apertures 18 in the rear wall. There is a guide slot 30d in the center upper portion 30c that opens upwardly. The inner portions of the panels 30a and 30b are affixed to longitudinally extending guide pieces 30e and 30f that slide against the abutting parallel edges or sidewalls 12e of the raised center portion 12d of the bottom 12l. The right guide 30e has rack teeth 30g on its outer edge. These rack teeth 30g, see FIG. 4, mesh with a pinion 32 mounted on a shaft 32a that extends through an aperture in the bottom 12a. On the lower end of the shaft 32a is affixed a knurled control knob 33. This knob 33 has a key-way recess in its bottom center that removably receives a snap in and out remote control flexible rod 34 having a knurled knob 34a on its end. Thus, the turning of the knobs 33 or 34a telescopically move the framework 30 for focusing of the front lens system 17 with respect to the rear lens system 16.

Figure 6:
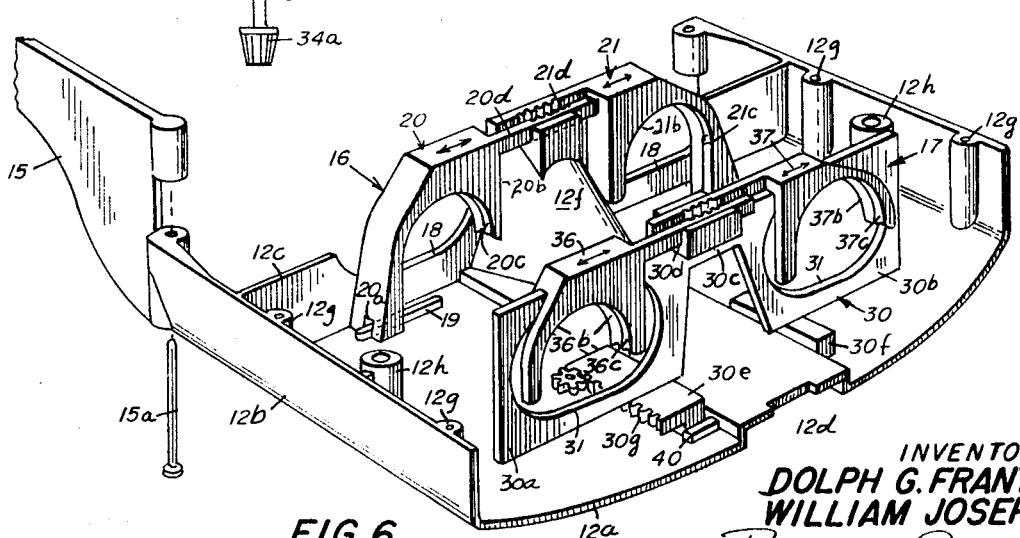
FIG. 6 is a perspective view having the upper half of the casing and the front shield removed and without lens installed.

The front lens system further includes lens receiving right and left frames 36 and 37 slidingly for interpupillar adjustment in a manner to those in the rear lens system 16. Each of the frames 36 and 37 have bifurcated depending portions 36a and 37a slidably received over the panels 30a and 30b respectively of the front framework 30. These depending portions 36a and 37a form arcuate depending openings that each have a pair of longitudinally spaced apart grooves, 36b and 37b the rear grooves and 36c and 37c the front grooves that frictionally receive framed lens (not shown in FIG. 6, see FIG. 2). Each of the front lens receiving frames 36 and 37 have horizontally extending towards each other members 36d and 37d slidably supported in the guide slot 30c, see FIG. 5, and longitudinally spaced apart and having rack teeth facing each other. Positioned between the rack members 36d and 37d is a pinion 38 having an axial shaft 38a mounted at its lower end in a bearing recess in the framework member below the slot 30c. The shaft 38a extends upwardly through a longitudinally extending slot-way 13i in a slightly depressed portion in the top 13a, see FIG. 1. A knurled control knob 39 affixed to the top end of shaft 38a adjusts the interpupillar distance of the front lens receiving frame openings 36a and 37a. There is a stop 40, see FIG. 6, affixed to the bottom 12a to limit the forward movement of the guide 30e. The rear movement of the front lens system is limited by the rear ends of the guides 30e and 30f striking the rear wall 12c, see FIGS. 4 and 5.

Figure 2:
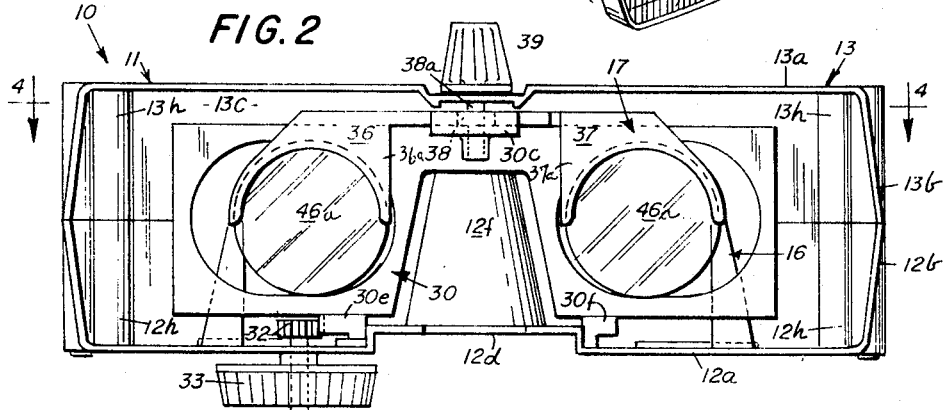
FIG. 2 is a front elevational view without the front shield.
Figure 3:
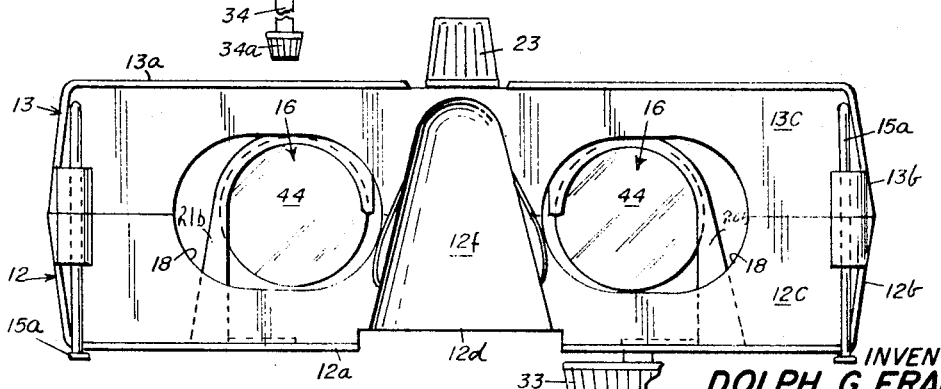
FIG. 3 is a rear elevational view without temples installed.

In FIGS. 2 and 3, lenses are in place in the grooves. In FIG. 3, the rear grooves of the rear lens system 16 carry framed lens 44 that are personal prescription lenses, for the user. In the forward grooves of the rear lens system just forward of the framed lens 44 see FIG. 4, there is received the rear unit lenses 45 of the binocular system. In the front lens system 17, the rear grooves 36b and 37b thereof have mounted therein the front binocular lens 46a In the front grooves 36c and 37c there is mounted frame lenses for near point vision for people with subnormal vision.

With appropriate lenses and/or filters or combinations thereof this instrument can also be used as follows:

1. This instrument can be adapted as a Visual Training or Orthoptic unit used for training and strengthening crossed, unbalanced or Amblyopic (nondeveloped) eyes. This is accomplished by placing in the clear cover shield 14 a filter of Polaroid with 45° configuration and a like Polaroid filter of proper configuration covering the object area viewed such as either a television screen or similar animated object area being viewed.

2. A specially adapted model of this instrument with the temple pieces removed and replaced with the necessary holding attachments can be fitted in front of existing models of Phoropters (lens refracting units which are used by all Optometrists and Ophthalmologists in examining eyes) thus enabling them to then examine the eyes of their patients through both instruments simultaneously and thereby arrive at the best possible subnormal prescription aid for the individual. This prescription can then be finalized by inserting same in position as indicated at 44 in FIG. 4.

There is provided a binocular instrument that is worn by the wearer and has the usual telescopic controls for the binocular lens system with interpupillar adjustment. Further, there is provided personal lens for the wearer in the rear lens system and slip on and off capped lens in the front lens system to enhance the correction of subnormal vision for near point vision such as reading.

I claim:

1. In an optical instrument of the binocular type, comprising, a lens casing having a bottom, top, two side walls and one rear wall, the bottom and rear walls having aligned recessed portions for receiving the nose of the wearer;

said rear wall having eye apertures positioned to each side of the recessed nose portion;

rear lens receiving frames in the casing adjacent said rear wall for each eye of the wearer and means mounting and controlling said rear lens receiving frames for interpupillar spacing;

front lens receiving frames in the casing for each eye of the wearer;

means mounting said front lens receiving frames for telescopic movement to and from the rear lens frames; and said telescopic front lens mounting means having means for controlling the interpupillar spacing of the front lens frames;

said interpupillar spacing means and said telescopic mounting means providing maintenance of a selected parallel interpupillar setting of said rear and front lens receiving frames;

said means mounting said front lens receiving frames for telescopic movement being a framework having eye apertures therethrough in line with said front lens receiving frames;

said framework having guide means mounting it in said casing for telescopic movement and control means extending to the outside of said casing for telescopically moving said framework;

said front lens receiving frames being a pair of separate members transversely slidably mounted on said framework;

said means for controlling the interpupillar spacing of the front lens frames includes a gear rack facing each other on each of said front lens frame separate members, a common pinion between and meshing with said gear racks and a shaft on said pinion and extending at one end in a bearing recess in said framework and the other end extending through a longitudinally extending slot in said casing and having a control knob thereon above said top for rotating the pinion.

2. An optical instrument according to claim 1 wherein said lens casing comprises two parts consisting of a lower integral half and an upper integral half and having means separably securing the two halves together.

3. In an optical instrument of the binocular type, comprising, a lens casing having a bottom, top, two sidewalls and one rear wall, the bottom and rear walls having aligned recessed portions for receiving the nose of the wearer;

said rear wall having eye apertures positioned to each side of the recessed nose portion;

rear lens receiving frames in the casing adjacent said rear wall for each eye of the wearer and means mounting and controlling said rear lens receiving frames for interpupillar spacing;

front lens receiving frames in the casing for each eye of the wearer;

means mounting said front lens receiving frames for telescopic movement to and from the rear lens frames; and said telescopic front lens mounting means having means for controlling the interpupillar spacing of the front lens frames;

said interpupillar spacing means and said telescopic mounting means providing maintenance of a selected parallel interpupillar setting of said rear and front lens receiving frames;

said means mounting and controlling said rear lens receiving frames being a pair of separate members, each member having a vertically extending portion having a guide means at its bottom end cooperating with guide means in the casing bottom for transverse movement, an arcuate upper and generally semicylindrical downwardly opening portion extending from the vertical portion and having arcuate groove means therein for frictionally receiving at least one removable lens, said arcuate portion having at its upper portion a transversely extending portion having rack teeth therein, each of said members having the rack teeth oppositely disposed;

said bottom of the casing having a top portion on said nose receiving recessed portion with transverse guideways therein for slidably receiving said upper transverse portions on said lens receiving separate members at a position adjacent the top of the casing, said means controlling said lens receiving frames including a pinion shaft and pinion thereon mounted between said rack teeth, said pinion shaft lower end received in a bearing recess in the top portion of the nose receiving recess portion and an upper portion extending through an aperture in the casing top; and a control knob on the top of said pinion shaft for rotating said pinion.

4. An optical instrument according to claim 3 wherein said means mounting the front lens receiving frames is a telescopically mounted framework in said casing;

said casing having a longitudinal guide means in its bottom;

said framework having longitudinal guide means for telescopic sliding movement by said guide means in the casing bottom, eye apertures therethrough in line with said front lens receiving frames;

said framework having control means thereon cooperating with control means extending to the exterior of the casing for telescopically adjusting the position of the framework with respect to said rear lens receiving frames;

said framework having transversely extending guideways in its upper portion;

each of said front lens receiving frames having depending arcuate portions opening downwardly and having groove means therein for removably receiving and frictionally holding therein at least one lens and a transversely inward extending portion having rack teeth therein opposing the rack teeth in the adjacent lens receiving frame and guidingly received for sliding movement in said guideways in the top of said framework;

a pinion positioned between said last mentioned rack teeth portions and having a support shaft mounted in a bearing recess in said framework and an upper shaft portion extending up through a longitudinally extending slot in said casing top; and a control knob on said shaft above said casing top for rotating the pinion to adjust the interpupillary spacing of said front lens receiving frames.

5. An optical instrument according to claim 4 wherein said top of the casing has a rear arcuate edge to receive the forehead of the wearer, the sides extend rearwardly beyond the rear wall to the extent of the adjacent rear edge of the arcuate top and temples extend rearward from the rear of the sides.